United States Patent [19]

Berger

[11] Patent Number: 5,086,753
[45] Date of Patent: Feb. 11, 1992

[54] PORTABLE GRILL WITH PEDESTAL MOUNT

[75] Inventor: Bernard B. Berger, Aiken, S.C.
[73] Assignee: The Ducane Company, Inc., Columbia, S.C.
[21] Appl. No.: 660,863
[22] Filed: Feb. 26, 1991
[51] Int. Cl.⁵ ............................................. F24C 3/00
[52] U.S. Cl. ............................. 126/41 R; 126/25 R; 126/9 R
[58] Field of Search .................. 126/25 R, 41 R, 9 R; 219/443

[56] References Cited

U.S. PATENT DOCUMENTS

| | | |
|---|---|---|
| 3,915,146 | 10/1975 | Bauer . |
| 3,938,494 | 2/1976 | Clark .................. 126/41 R |
| 4,403,597 | 9/1983 | Miller . |
| 4,426,990 | 1/1984 | Shepherd . |
| 4,446,846 | 5/1984 | Hahn . |
| 4,526,158 | 7/1985 | Lee . |
| 4,541,406 | 9/1985 | DaSambiagio . |
| 4,621,608 | 11/1986 | Lee . |
| 4,662,349 | 5/1987 | McKenzie et al. . |
| 4,741,321 | 5/1988 | Squires . |
| 4,869,228 | 9/1989 | Sorensen ................. 126/41 R |

Primary Examiner—Carroll B. Dority
Attorney, Agent, or Firm—Pollock, Vande Sande & Priddy

[57] ABSTRACT

A portable grill comprising a portable housing, a pair of spaced-apart leg members mounted in opposing relation on the portable housing, a pedestal for supporting the housing on a support surface, and a pair of fastening assemblies each for detachably connecting a corresponding one of the leg members to the pedestal. When detached from the pedestal, the leg members independently support the housing on a support surface. Mounted on the housing may be a hinged lid, and a gas system including a gas burner, control valve, ignitor, pressure regulator, and a connector for connecting the gas burner to either a portable gas container transportable with the housing or a hose from a tank enclosed in a cabinet formed by the pedestal. The lower end of the pedestal may include a wheeled platform for moving the grill when the housing is attached to the upper end of the pedestal.

20 Claims, 3 Drawing Sheets

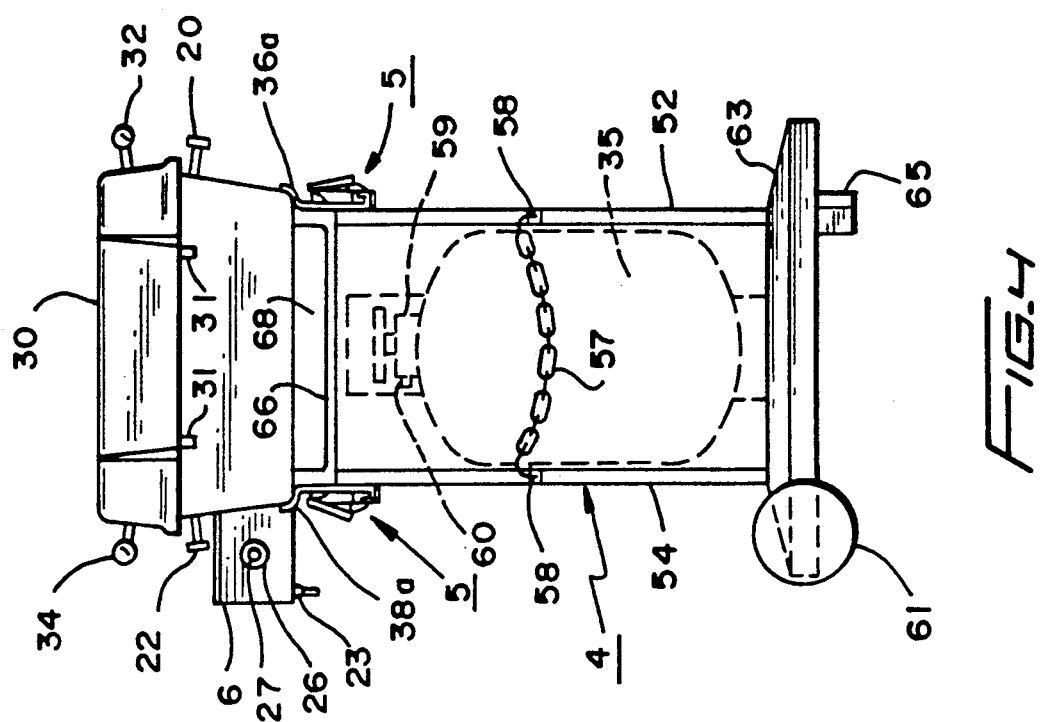
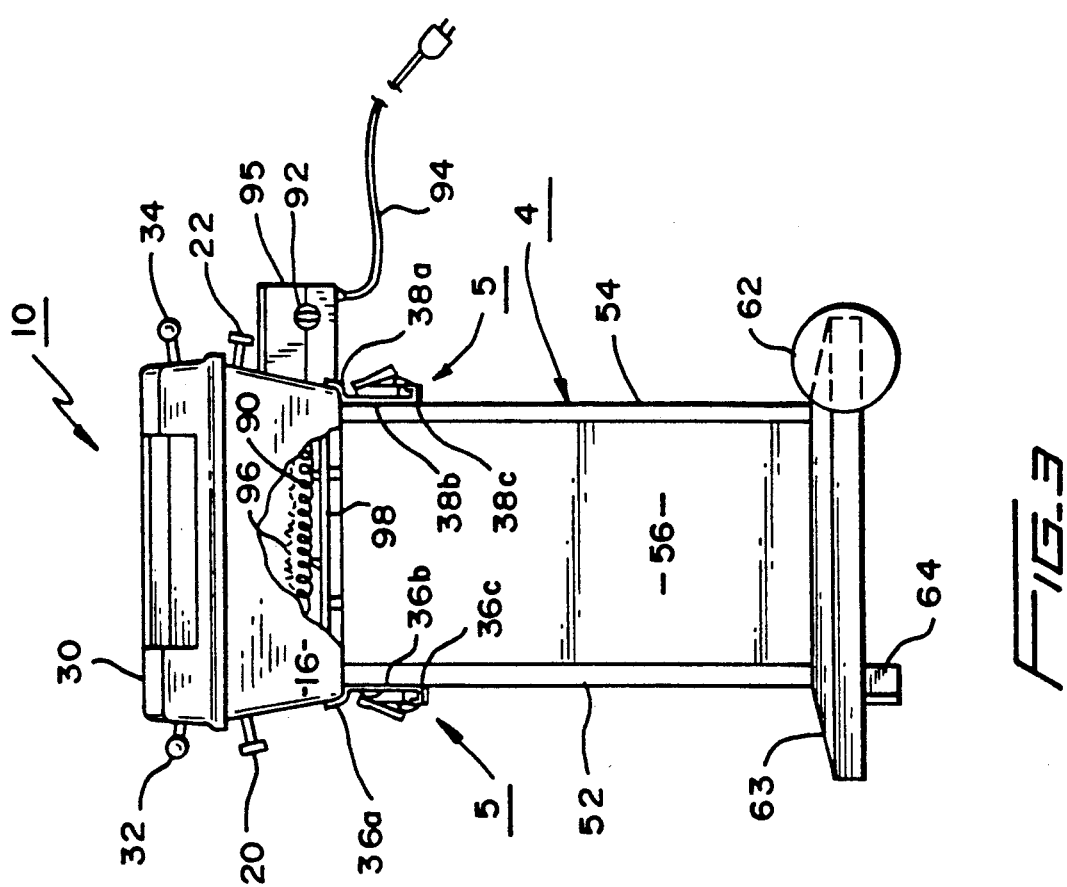

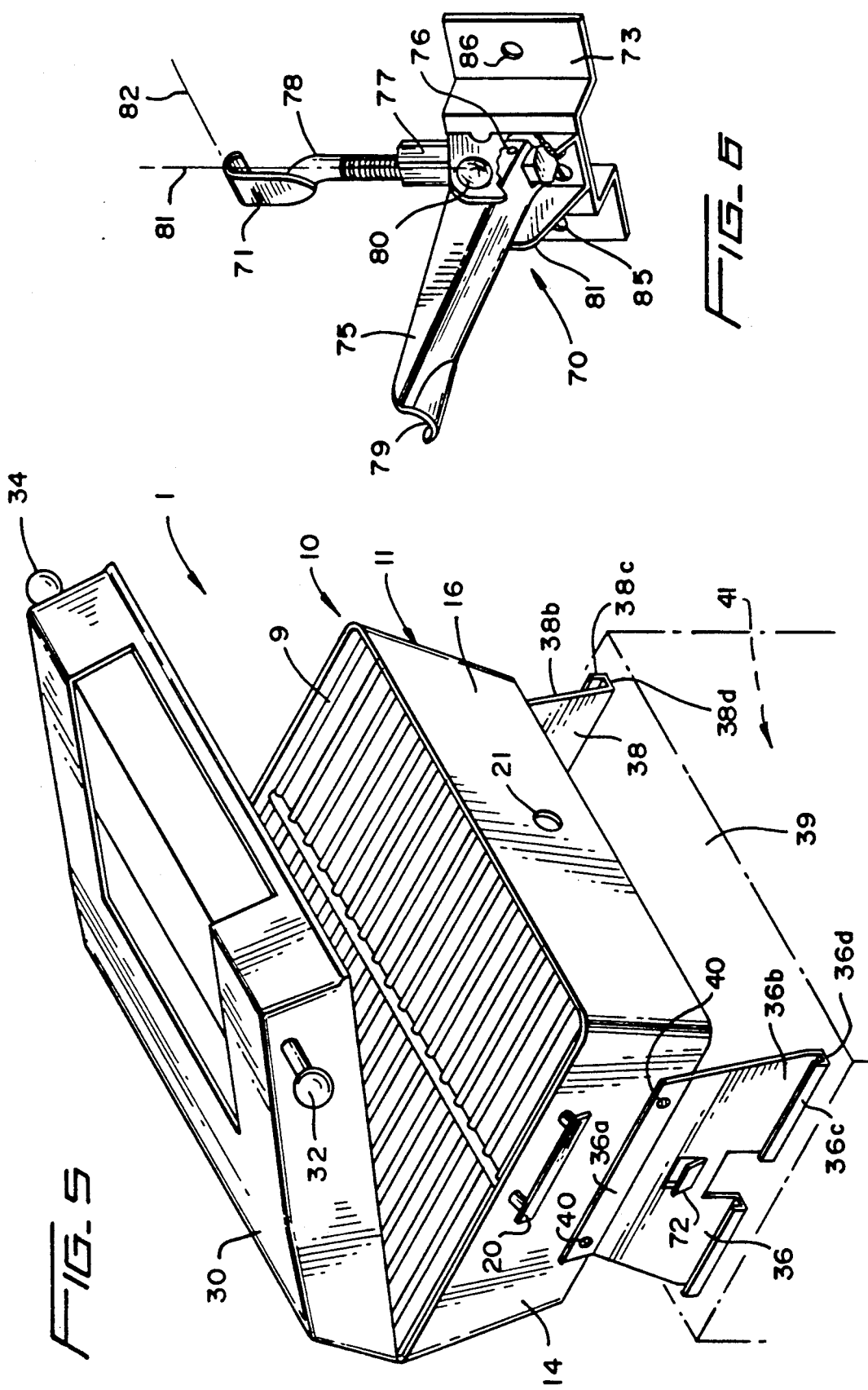

PORTABLE GRILL WITH PEDESTAL MOUNT

TECHNICAL FIELD

The present invention relates to outdoor grills, and more particularly to portable outdoor grills, such as barbecue grills.

BACKGROUND OF THE INVENTION

A portable outdoor grill should be light and compact in order to be sufficiently portable for practical use away from home, such as for use by campers or picnickers. As a result, the typical portable barbecue grill is not gas-fired and is not provided with a stand or other features which although useful, would increase its weight or bulk. Consequently, portable barbecue grills in the past have lacked features which are desirable for use at home, such as gas burners and a pedestal or cabinet specifically designed for securely supporting a grill head and optionally housing a liquid gas tank or the like.

SUMMARY OF THE INVENTION

A principal object of the present invention is to provide an outdoor gas-fired grill which is portable, yet includes features which allow its use at home in an installation that is typically available only in connection with non-portable grills.

Another object of the invention is to provide a grill head having dual-purpose leg means which may be used for either directly supporting the grill head on a substantially level support surface or attaching the grill head to a pedestal or other fixed or movable base, which in turn supports the grill head at a greater distance above a substantially level support surface.

A further object of the invention is to provide a portable outdoor grill which may employ different types of heating elements as the heating means, such as combustible coals, radiant electrical coils, or gas burners.

Another object of the invention is to provide a portable outdoor grill unit having gas supply means for attaching a portable gas bottle to the grill head for supplying fuel to a gas-fired heating element carried within the grill head.

Yet another object of the invention is to provide a portable outdoor grill including a self-ignitor assembly on the grill head for providing an electric spark for igniting one or more gas burners carried within the grill head.

A still further object of the invention is to provide a gas-fired outdoor grill comprising a portable grill unit having gas supply means for detachably connecting both portable and non-portable fuel containers to gas heating means in a grill head, a pedestal unit which may be either fixed or mobile and optionally may include a cabinet for housing a fuel container, and fastening means for detachably connecting the portable grill unit to the pedestal unit.

Other objects of the invention include providing a portable gas-fired grill unit with a gas supply system comprising connector means for detachably connecting the system to a gas source, valve means for controlling the rate of gas flow, and gas pressure regulating means; with flame observation means in the grill head; and with quick-acting, hand-actuated fastening means for detachably connecting the portable grill unit to a fixed or mobile pedestal, such as a wheel supported cabinet or stand, or a fixed post or the like.

In accordance with the present invention, there is provided a dual-purpose outdoor grill which is adapted to be supported either on a pedestal or directly on a substantially level support surface. The pedestal structure for supporting the grill head may comprise a fixed structure resting on or embedded in the ground, or a mobile structure such as a wheeled cabinet which may enclose a standard storage tank for liquified gas. The mobile cabinet preferably includes a front wall and two opposed, spaced-apart sidewalls extending vertically in substantially parallel relation and mounted on a wheel supported platform.

The grill unit which is associated with the pedestal comprises a grill head which preferably includes a front wall, a back wall, a pair of opposed spaced-apart sidewalls, and a bottom wall. A depending leg member is secured to each sidewall of the grill head and extends downwardly below the bottom wall of the grill head for engaging the sidewalls of the pedestal cabinet when the grill head is supported by the pedestal, and for supporting the grill head directly on a table or other suitable support surface when the grill head is removed from the pedestal for transport and use as a portable grill unit.

The grill head preferably also includes a lid, is made of cast aluminum, and encloses and supports one or more heating elements and a cooking grid within its walls. The heating elements may be one or more gas burners, one or more electrical coils of the radiant type, or a plurality of combustible coals. Optionally, the grill head also may enclose and support ceramic coals positioned between the heating elements and the overlying cooking grid and/or beside the heating elements. Means may be provided on the grill head for connecting electrical heating elements to a source of electrical power, or gas burner(s) to different sources of combustible gas, such as a highly portable bottle or a flexible conduit from a larger capacity and heavier but still portable tank, a fixed tank, or a natural gas utility pipe.

The present invention thereby provides an outdoor grill which, although portable, has advantages typically associated only with more permanent grill installations, such as outdoor gas grills on a fixed base or a base of much more limited mobility. When mounted on its pedestal unit, the portable grill unit emulates a fixed base outdoor grill and is at or near table height without taking up table or counter space. Although the grill unit can be firmly and securely attached to the pedestal unit, the former is quickly and easily releasable from the latter for use as a portable grill.

BRIEF DESCRIPTION OF THE DRAWINGS

A further understanding of the invention may be derived from the detailed description of the invention given below taken in conjunction with the accompanying drawings in which:

FIG. 3 is a front elevational view of a modification of the grill of FIG. 1;

FIG. 4 is a rear elevational view of the grill of FIG. 1;

FIG. 5 is a front perspective view of the portable grill unit of the present invention showing the grill head with its lid in a partially open position and the grill legs resting upon an auxiliary supporting surface;

FIG. 6 is a perspective view in partial section of a fastening assembly for detachably securing the portable grill unit to the pedestal unit in accordance with the invention.

DETAILED DESCRIPTION OF THE INVENTION

Figure 1:
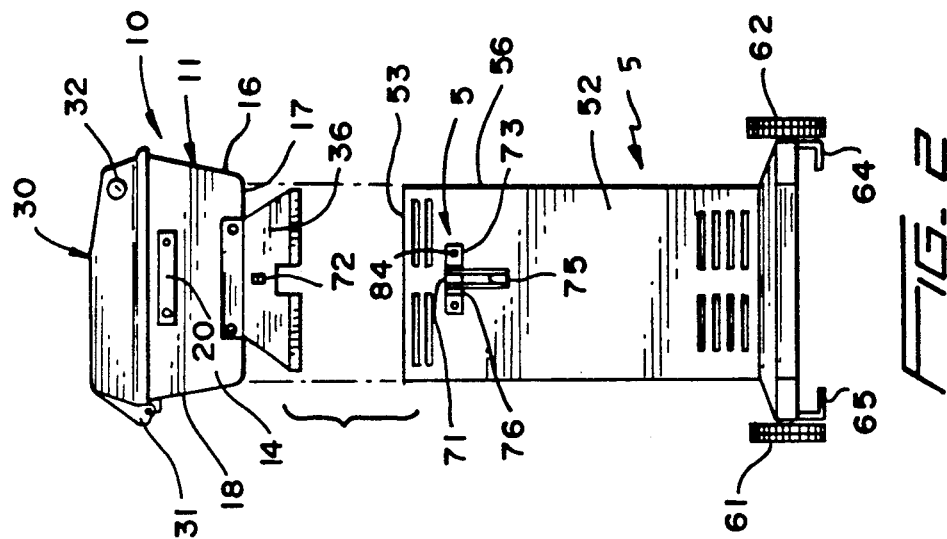
FIG. 1 is a front perspective view of the grill of the present invention as mounted on a cabinet type pedestal.
Figure 2:
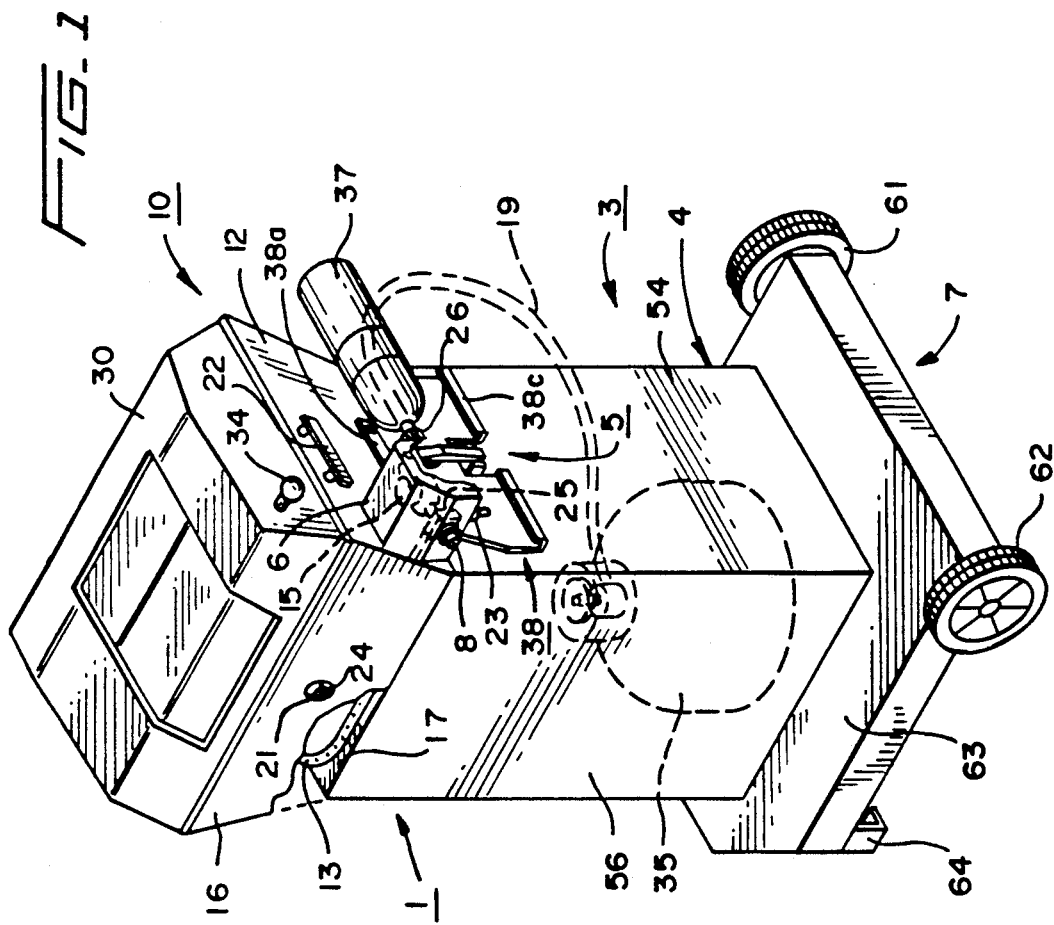
FIG. 2 is a left side elevational view of the grill of FIG. 1.

Referring to the drawings, FIG. 1 shows a grill 1 made according to the present invention and comprising a pedestal 3 having a cabinet 4 to which a grill head 10 is secured by a fastening means 5. Pedestal 3 also includes a mobile pedestal base 7, and grill head 10 comprises a grill lid 30, a cooking grid 9 (FIG. 5), one or more gas burners 13 beneath grid 9, a grill housing 11, and leg members 36,38 secured to the respective sidewalls 12,14 of grill housing 11. A coal grate (not shown), such as that described in U.S. Pat. No. 3,989,028, which is incorporated herein by reference, may be positioned in the grill head 10 for supporting a bed of ceramic coals between the burner(s) 13 and the cooking grid 9.

The grill housing 11 is defined by a bottom wall 17, sidewalls 12 and 14, a front wall 16, and a back wall 18. Front wall 16 is preferably provided with a aperture 21 for viewing a coil of Nichrome wire 24, which glows when contacted by a burner flame to confirm proper ignition of the gas burner(s). Sidewalls 12,14 are provided with handles 20,22 for carrying the portable grill unit and with the supporting leg members 36,38, which provide means both for securing the grill unit in place on pedestal cabinet 4 or for directly supporting the grill unit on a suitable substantially level support surface 39, such as the top surface of a box or table 41 (FIG. 5) resting upon the ground, or on the ground itself. The grill lid 30 is pivotally secured to back wall 18 of grill housing 11 by a pair of hinges 31,31. Auxiliary handles 32,34 are provided at the respective sides of lid 30 for opening the lid as shown in FIG. 5.

As shown best in FIGS. 1 and 4, the gas supply system of the portable grill unit 10 is connected to a combustible gas source, which may be either a refillable tank 35, preferably housed within pedestal cabinet 4, or a highly portable bottle 37 which may be thrown away when empty. The highly portable bottle 37 is provided as a source of combustible gas for use when grill head 10 is detached from pedestal 3; however bottle 37 also may be used, if desired, as an alternative to tank 35 while grill head 10 is secured to pedestal 3. The flow of combustible gas to the grill burner(s) is controlled by a valve 25, which is mounted within a control box 6 and activated by a control knob 8, and the gas pressure is controlled by a pressure regulator 15 within control box 6.

Tank 35 is connected to pressure regulator 15 through a flexible hose 19 and a quick connect/disconnect coupling 26 mounted on control box 6. Coupling 26 also is adapted to connect the outlet of portable fuel bottle 37 to pressure regulator 15 in place of hose 19, and is rigidly secured by control box 6 to housing 11 with sufficient structure to carry the cantilevered weight of bottle 37 when completely filled with fuel. As further alternatives, hose 19 may connect coupling 26 to a fixed tank of liquified gas or to the natural gas pipe of a utility company. Control box 6 is preferably provided with a hand-actuated electrostatic gas burner ignitor 23, which may be of the piezoelectric type and actuated by either a push button or rotary actuator.

Grill leg members 36,38 are identical to each other and leg member 36 will be described in detail as shown in FIGS. 2-5. Leg member 36 is preferably made of sheet metal and comprises an upper portion 36a, an intermediate portion 36b, and a lower portion 36c. Upper portion 36a is configured to conform to the lower edge portion of sidewall 14 of grill housing 11 and is secured thereto by rivets, screws or equivalent fastening elements 40. Intermediate portion 36b extends vertically below bottom wall 17 and is configured to conform to a sidewall 52 of pedestal cabinet 4. Intermediate portion 36b is provided with an outwardly projecting tab 72 which cooperates with a hook member 71 of latch assembly 70, thereby forming fastening means 5 for securing grill head 10 to pedestal cabinet 4. Tab 72 is preferably formed by punching and bending out a part of the sheet metal of leg member 36. Lower edge portion 36c of leg member 36 has an upwardly facing U-shape which provides a flat or rounded segment 36d for contacting a support surface 39 when grill head 10 is in use as a portable unit and therefore is separated from pedestal unit 3. Leg member 38 has corresponding portions 38a, 38b and 38c, and a corresponding flat or rounded segment 38d.

Pedestal cabinet 4 comprises substantially parallel, opposed and substantially vertical sidewalls 52,54 and a front wall 56. As shown best in FIG. 4, cabinet 4 is preferably open at the back for receiving a relatively large and heavy (when filled) liquid gas tank 35, which is refillable and may be releasably held within the enclosure defined by front wall 56 and sidewalls 52,54 by a strap or chain 57 having hooks at each end for engaging a pair of metal rings or eyes 58,58 at the rear edges of sidewalls 52 and 54, respectively. Tank 35 is provided with a valve 59 and a coupling 60 for connection to the end of hose 19 opposite to coupling 26. Although the highly portable bottle 37 also may include such a valve, optionally coupling 26 has a hollow prong or needle 27 (FIG. 4) which pierces a diaphragm (not shown) that seals the neck of bottle 37 until it is screwed into coupling 26 for the first time.

Pedestal cabinet 4 is supported on a pedestal base 7 comprising a platform 63, which is provided with a pair of wheels 61,62 and a pair of feet 64,65. Cabinet 4 optionally includes a top wall 66 which may serve as a heat shield for tank 35 and defines an insulating chamber 68 beneath bottom wall 17 of grill housing 11.

As noted above, the latch assembly 70 is provided for securing grill head 10 on cabinet 4 of pedestal 3. Latch assembly 70 is quick acting and includes the hook member 71 for hooking over and pulling down on the tab member 72, which preferably is punched and bent outwardly from each of the legs 36,38, when the latter are formed from sheet metal. Latch assembly 70 also comprises a U-shaped bracket 73 and an activating lever 75. Bracket 73 is fastened to an upper portion of sidewalls 52 and 54 of pedestal cabinet 4 by bolts or screws 84 which pass through bracket apertures 85 and 86 and into sidewalls 52 and 54. Lever 75 is pivotable by hand operation about a pivot pin 80 which extends between opposing ears of a mounting base 81 and forms a first pivot connection. Lever 75 also is connected to an internally threaded elongated member 77 by a second pivot connection 76. The proximal end of a shaft 78 is threaded into the outer end of member 77 and shaft 78 is provided at its distal end with the hook member 71 for engaging latch tab 72.

As lever 75 pivots about pin 80, the shaft 78, which is in threaded engagement with the internal threads of member 77, is extended or retracted by corresponding linear movement of member 77 caused by the second pivot connection 76. Rotation of lever 75 toward shaft 78 causes hook member 71, when hooked over tab 72, to clamp down on tab 72, and as the correspondingly shaped distal end portion 79 of lever 75 nears abutment with shaft 78, second pivot connection 76 passes into an over-center position which releasably locks lever 75 against shaft 78, which in turn releasably locks hook member 71 over tab 72 and thereby releasably secures grill head 10 to pedestal 3. The over-center position providing this hand actuated and quickly releasable locking action occurs when second pivot connection 76 moves clockwise (FIG. 6) past an imaginary over-center axis represented by broken line 81. Axis 81 passes through both the transverse pivot axis of pivot pin 80 and a transverse imaginary contact line 82 along which hook member 71 engages tab 72.

The threaded connection of shaft 78 to elongated member 77 provides means for ready adjustability of the tension that hook member 71 may exert on tab 72, so that grill head 10 may be pressed tightly against the top rim of pedestal cabinet 4. In addition, the shape and bent structure of sheet metal tab 72 provides resilience and adjustable tension to the connection between grill head 10 and pedestal 3 as provided by latch assembly 70. Lever mechanisms of the type mounted on bracket 73, as shown in the drawings and described above, are commercially available and may be obtained, for example, from Nielsen Hardware Corp. of Hartford, Conn.

The grill head 10 of FIG. 3 is identical to that of the other figures, except it is configured for an electric radiant heating element 90 of preferably about 1500 watts and 120 volts, instead of a gas burner, and for electrical control knob 92 and an electric power cord 94 connected to an electrical control box 95. The heating element 90 may have refractory briquettes or lumps 96 positioned adjacent thereto, and both the heating element and refractory material may be supported on a stainless steel reflection plate 98, to which the heating elements are preferably attached in order to increase the radiant heat directed toward the grilling surface of grid 9.

The drawings and the foregoing description are intended to illustrate the best mode and preferred embodiments, and not to limit the present invention. Workers in the art will be able to make changes and adaptations therein without departing from the scope of the invention as defined by the features claimed below and equivalents thereof.

What is claimed is:

1. An outdoor grill comprising:
   head means for supporting heating means in spaced relation beneath food support means so as to cook food supported on the food support means;
   leg means mounted on said head means for directly engaging a support surface to support said head means at a first distance above the support surface;
   pedestal means for supporting said head means at a second distance above the support surface, said second distance being substantially greater than said first distance, and said pedestal means comprising a vertically extending pedestal and foot means at a lower end portion of said pedestal for cooperating with the support surface to support said pedestal in an upright position; and,
   fastening means for releasably attaching said leg means to said pedestal means such that said head means may be selectively connected to and disconnected from an upper end portion of said pedestal.

2. An outdoor grill according to claim 1 wherein said fastening means comprises engaging means carried by a first lever for engaging a part of said leg means, a second lever, and means for pivotally mounting the second lever on said pedestal means, said first lever being pivotally connected to said second lever such that said second lever has an over-center position for mechanically locking said first and second levers at fixed positions relative to each other in which said engaging means is maintained in engagement with said leg means part until said second lever is moved from said over-center position by a releasing force, said second lever being movable into and out of said over-center position by hand actuation.

3. An outdoor grill according to claim 2 wherein said engaging means applies a clamping force against said leg means part when said second lever is in said over-center position, and wherein said fastening means further comprises means for adjusting the length of said first lever so as to vary the clamping force applied to said leg means part by said engaging means.

4. An outdoor grill according to claim 1 wherein said grill head comprises a pair of sidewalls spaced apart in opposing relation, said leg means comprises a pair of leg members each secured to a corresponding one of said sidewalls, and said fastening means comprises a pair of fastening assemblies each for releasably attaching a corresponding one of said leg members to said pedestal means.

5. An outdoor grill according to claim 4 wherein said pedestal means comprises a cabinet for housing a container of combustible gas, said cabinet comprising a pair of spaced-apart sidewalls arranged in opposing relation; wherein each of said fastening assemblies is mounted on a corresponding one of said cabinet sidewalls; and wherein said head means further comprises gas supply means for connecting a gas line from said container to gas heating means supported in said head means.

6. An outdoor grill according to claim 5 wherein each of said leg members comprises a metal sheet having an upper portion shaped to conform to a lower edge portion of the corresponding sidewall of said grill head, and having a lower portion shaped to conform to a corresponding one of said cabinet sidewalls.

7. An outdoor grill according to claim 4 wherein each of said fastening assemblies includes a hook member, and each of said leg members comprises a latch element arranged to be engaged by a corresponding one of said hook members.

8. An outdoor grill according to claim 7 wherein at least a portion of each of said leg members is made of sheet metal and said latch element is formed from part of said sheet metal portion.

9. An outdoor grill according to claim 1 wherein said leg means comprises a pair of leg members each made of sheet metal and having a lower edge bent to provide a flat or rounded segment for supporting said grill head means on a supporting surface when said head means is disconnected from said pedestal means.

10. An outdoor grill according to claim 1 wherein said foot means comprises wheel means and means for mounting said wheel means on the lower end portion of said pedestal such that said wheel means carries the weight of the grill for translational movement of the grill across a supporting surface while said head means is connected to said pedestal means by said fastening means.

11. An outdoor grill according to claim 1 wherein said head means comprises a housing having a front wall, a back wall, a pair of spaced apart sidewalls in opposing relation and a bottom wall; and cover means comprising lid means for covering an opening defined by said housing, and hinge means for pivotally connecting said lid means to said housing, and handle means mounted on said lid means for rotating said lid means about said hinge means to selectively cover and uncover said opening.

12. An outdoor grill according to claim 1 wherein said head means comprises a housing for supporting gas heating means in spaced relation beneath a food supporting grid member, and gas supply means for connecting said gas heating means to a source of combustible gas.

13. An outdoor grill according to claim 12 wherein said gas supply means includes connection means for connecting said gas heating means alternatively to a flexible conduit for supplying gas from a separate gas source and to a container carried by and portable with said head means when said head means is disconnected from said pedestal means, said connection means including means for mounting said portable container on said housing for transport therewith.

14. An outdoor grill according to claim 12 wherein said gas supply means further comprises pressure regulator means for regulating the pressure of gas supplied to said gas heating means, and valve means for controlling the flow of gas from said gas source to said gas heating means.

15. An outdoor grill according to claim 12 wherein said head means further comprises hand-actuated ignitor means for providing an electric spark for ignition of gas discharged by said gas heating means.

16. An outdoor grill according to claim 1 wherein said head means comprises housing means having a pair of spaced-apart sidewalls arranged in opposing relation, and handle means having a pair of handle members each mounted on a corresponding one of said sidewalls for lifting and transporting said head means when said head means is disconnected from said pedestal means by releasing said fastening means.

17. An outdoor grill according to claim 1 wherein said head means comprises a housing having a bottom wall for supporting gas heating means in spaced relation beneath food support means, and wherein said pedestal means comprises upstanding wall means defining an enclosure for at least partially enclosing a gas storage container for supplying gas to said gas heating means, and heat shield means supported by said wall means and positioned to be between the bottom wall of said housing and said gas container to prevent at least a portion of heat radiation from said bottom wall from reaching said gas container.

18. An outdoor grill according to claim 17 wherein said heat shield means comprises a horizontally extending wall positioned in spaced relation beneath the bottom wall of said housing to define an insulating space above said gas container enclosure.

19. An outdoor grill according to claim 1 wherein said fastening means comprises actuating means operable by hand.

20. An outdoor grill according to claim 1 wherein said head means comprises a housing for supporting a radiant electrical heating element in spaced relation beneath a food supporting grid member, and electrical supply means for connecting said heating element to a source of electrical power.

* * * * *